US010174770B2

(12) United States Patent
Zhang et al.

(10) Patent No.: US 10,174,770 B2
(45) Date of Patent: Jan. 8, 2019

(54) SYSTEM AND METHOD OF HYDRAULIC ENERGY RECOVERY FOR MACHINE START-STOP AND MACHINE RIDE CONTROL

(71) Applicant: Caterpillar Inc., Peoria, IL (US)

(72) Inventors: Jiao Zhang, Naperville, IL (US); Dayao Chen, Bolingbrook, IL (US); Sudheer Holenarasipura, Oswego, IL (US)

(73) Assignee: Caterpillar Inc., Deerfield, IL (US)

( * ) Notice: Subject to any disclaimer, the term of this patent is extended or adjusted under 35 U.S.C. 154(b) by 331 days.

(21) Appl. No.: 14/936,172

(22) Filed: Nov. 9, 2015

(65) Prior Publication Data

US 2017/0130739 A1 May 11, 2017

(51) Int. Cl.
*F16D 31/02* (2006.01)
*F15B 1/02* (2006.01)
(Continued)

(52) U.S. Cl.
CPC ............ *F15B 1/024* (2013.01); *E02F 9/2207* (2013.01); *E02F 9/2217* (2013.01); *E02F 9/2246* (2013.01); *E02F 9/2296* (2013.01); *F15B 1/021* (2013.01); *F15B 1/027* (2013.01); *F15B 1/04* (2013.01); *F15B 1/26* (2013.01); *F15B 11/024* (2013.01); *F15B 11/16* (2013.01); *F15B 13/021* (2013.01); *F15B 13/16* (2013.01); *F15B 15/18* (2013.01); *F15B 21/14* (2013.01); *F15B 2211/20507* (2013.01); *F15B 2211/20546* (2013.01); *F15B 2211/20569* (2013.01); *F15B 2211/212* (2013.01); *F15B 2211/3058* (2013.01); *F15B 2211/633* (2013.01); *F15B 2211/6306* (2013.01); *F15B 2211/6309* (2013.01); *F15B 2211/6313* (2013.01); *F15B 2211/6333* (2013.01);
(Continued)

(58) Field of Classification Search
CPC .. F15B 1/024; F15B 1/027; F15B 1/04; F15B 11/16; F15B 13/16; F15B 13/021; F16H 61/0021; F16H 61/0031; F16H 2051/0034
USPC .......................................................... 60/418
See application file for complete search history.

(56) References Cited

U.S. PATENT DOCUMENTS 7,383,682 B2 6/2008 Kauss
7,621,124 B2 11/2009 Mizoguchi et al.
(Continued)

*Primary Examiner* — Thomas E Lazo
*Assistant Examiner* — Daniel S Collins
(74) *Attorney, Agent, or Firm* — William R. Tinker

(57) ABSTRACT

A hydraulic control system for a machine is provided. The hydraulic control system includes a fluid reservoir and a pump motor. The pump motor is fluidly coupled to the fluid reservoir. The pump motor is configured to provide pressurized fluid and to receive fluid to provide a power output to the shaft. The hydraulic control system further includes an actuator and an accumulator fluidly coupled to the pump motor and the actuator. The hydraulic control system further includes an accumulator valve and a controller. The accumulator valve is fluidly coupled between the accumulator and the pump motor. The controller is in communication with the pump motor and the accumulator valve. The controller is configured to detect an operator command to operate the power source; determine pressure at the accumulator; and selectively move the accumulator valve to fluidly connect the accumulator with the pump motor.

13 Claims, 6 Drawing Sheets

(51) Int. Cl.

| | |
|---|---|
| ***F15B 1/027*** | (2006.01) |
| ***F15B 1/04*** | (2006.01) |
| ***F15B 1/26*** | (2006.01) |
| ***F15B 11/024*** | (2006.01) |
| ***F15B 11/16*** | (2006.01) |
| ***F15B 13/02*** | (2006.01) |
| ***F15B 13/16*** | (2006.01) |
| ***F15B 15/18*** | (2006.01) |
| ***F15B 21/14*** | (2006.01) |
| ***E02F 9/22*** | (2006.01) |

(52) U.S. Cl.

CPC ................. *F15B 2211/6346* (2013.01); *F15B 2211/6658* (2013.01); *F15B 2211/7053* (2013.01); *F15B 2211/7128* (2013.01)

(56) References Cited

U.S. PATENT DOCUMENTS

| | | | | |
|---|---|---|---|---|
| 7,703,280 | B2 | 4/2010 | Kobayashi et al. | |
| 2006/0108860 | A1* | 5/2006 | Stragier ................... | B60K 6/12 303/15 |
| 2013/0318955 | A1 | 12/2013 | Zhang et al. | |
| 2014/0283509 | A1 | 9/2014 | Hijikata | |
| 2015/0007557 | A1 | 1/2015 | Egawa et al. | |
| 2015/0247513 | A1* | 9/2015 | Morris .................. | E02F 9/2066 701/50 |

* cited by examiner

SYSTEM AND METHOD OF HYDRAULIC ENERGY RECOVERY FOR MACHINE START-STOP AND MACHINE RIDE CONTROL

TECHNICAL FIELD

The present disclosure relates generally to a hydraulic control system for a machine and, and more particularly, to a system and method of recovering hydraulic energy for machine start-stop and ride control function.

BACKGROUND

Hydraulically operated machines, such as, wheel loaders, excavators mining shovels etc. are typically employed to move heavy loads, such as construction material, debris and/or any other material. These machines utilize an implement system to carry the load. The implement system is generally powered by one or more hydraulic actuators which are fluidly coupled to an engine driven pump. The pump selectively supplies pressurized fluid into the chambers of the hydraulic actuators. As the pressurized fluid moves into or through the chambers, the pressure of the fluid acts on hydraulic surfaces of pistons within the chambers of the hydraulic actuators, to affect movement of the hydraulic actuators and thus a movement of the implement system is achieved.

During operation of such machine, the implement system may be raised to an elevated position, and lowered. As the implement system is relatively heavy and also carry load, the implement gains potential energy when raised to the elevated position. Typically, as the implement is lowered from the elevated position, this potential energy may be converted to heat as the pressurized hydraulic fluid is forced out of the hydraulic actuator and is throttled across a valve and returned to a tank. The conversion of potential energy into heat may result in an undesired heating of the hydraulic fluid, which may require the machine to have an additional cooling mechanism and added capacity.

U.S. Publication No. 2013/0318955 (Hereinafter referred to as '955 Publication). The '955 Publication discloses a hydraulic system having a hydraulic actuator, a pump configured to supply fluid to the hydraulic actuator, and a first accumulator fluidly coupled to the hydraulic actuator. The first accumulator is configured to store fluid received from the hydraulic actuator. The hydraulic system also includes a motor drivingly connected to the pump and fluidly coupled to the first accumulator. The motor is configured to receive the stored fluid from the first accumulator to drive the pump. The hydraulic system further includes a first discharge valve fluidly coupled between the first accumulator and the hydraulic actuator. The first discharge valve is configured to supply the stored fluid from the first accumulator to the hydraulic actuator without the stored fluid from the first accumulator circulating through the pump.

SUMMARY OF THE DISCLOSURE

In one aspect of the present disclosure a hydraulic control system for a machine having a power source is provided. The hydraulic control system includes a fluid reservoir, a pump motor coupled to a power source via a shaft. The pump motor is fluidly coupled to the fluid reservoir. The pump motor is configured to provide pressurized fluid and to receive fluid to provide a power output to the shaft. The hydraulic control system further includes an actuator, an accumulator, an accumulator valve and a controller. The actuator has a first chamber and a second chamber. Each of the chambers is fluidly coupled to the pump motor. The accumulator is fluidly coupled to the pump motor and the actuator. The accumulator valve being movable between a closed and an open position. The accumulator valve is fluidly coupled between the accumulator and the pump motor. The controller is in communication with the pump motor and the accumulator valve. The controller is configured to detect an operator command to operate the power source, and determine pressure of the accumulator. The controller is also configured to move the accumulator valve to the open position to fluidly connect the accumulator with the pump motor to provide power output to rotate the shaft for assisting in starting the power source.

In another aspect of the present disclosure, a method of operating a hydraulic control system having a power source is provided. The method includes determining an operator command to operate the power source. The method further includes determining a pressure at an accumulator. The method further includes moving an accumulator valve to an open position, to fluidly connect the accumulator with a pump motor, such that pressurized fluid from the accumulator is provided to the pump motor to provide power output to rotate a shaft of power source for assisting start of the power source.

In yet another aspect of the present disclosure, a machine having a work tool movable through a range of motion is provided. The machine includes a power source, a fluid reservoir, and a pump motor coupled to a power source via a shaft. The pump motor is fluidly coupled to the fluid reservoir. The pump motor is configured to provide pressurized fluid and to receive fluid to provide a power output to the shaft. The machine further includes an actuator, accumulator, an accumulator valve and a controller. The actuator has a first chamber and a second chamber. Each of the chambers is fluidly coupled to the pump motor. The accumulator is fluidly coupled to the pump motor and the actuator. The accumulator valve being movable between a closed and an open position. The accumulator valve is fluidly coupled between the accumulator and the pump motor. The controller is in communication with the pump motor and the accumulator valve. The controller is configured to detect an operator command to operate the power source, and determine pressure of the accumulator. The controller is also configured to selectively move the accumulator valve to the open position to fluidly connect the accumulator with the pump motor either to receive pressurized fluid to store or to provide power output to rotate the shaft for assisting in starting the power source.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
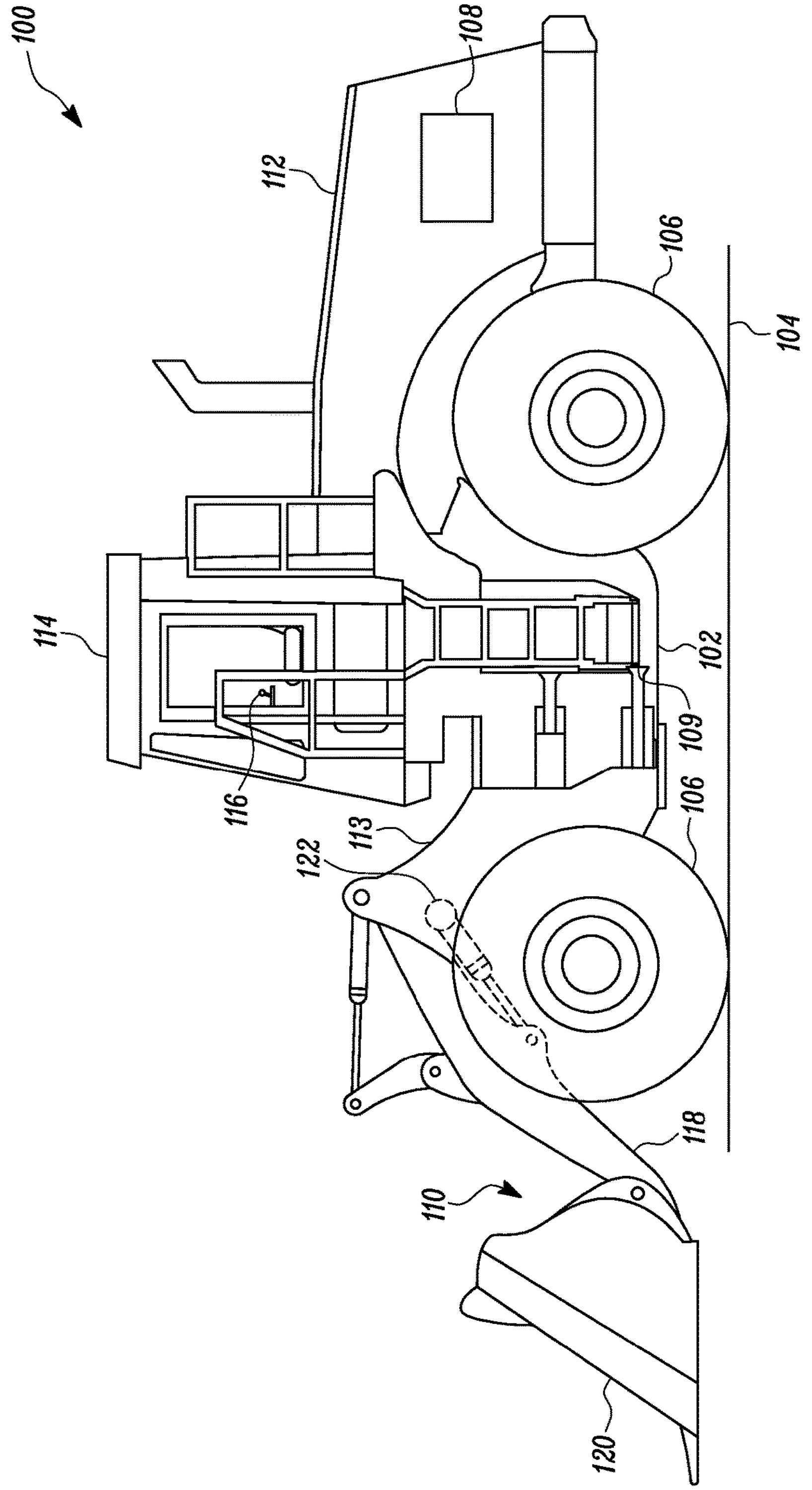
FIG. 1 is a side view of an exemplary machine in a first position.
Figure 2:
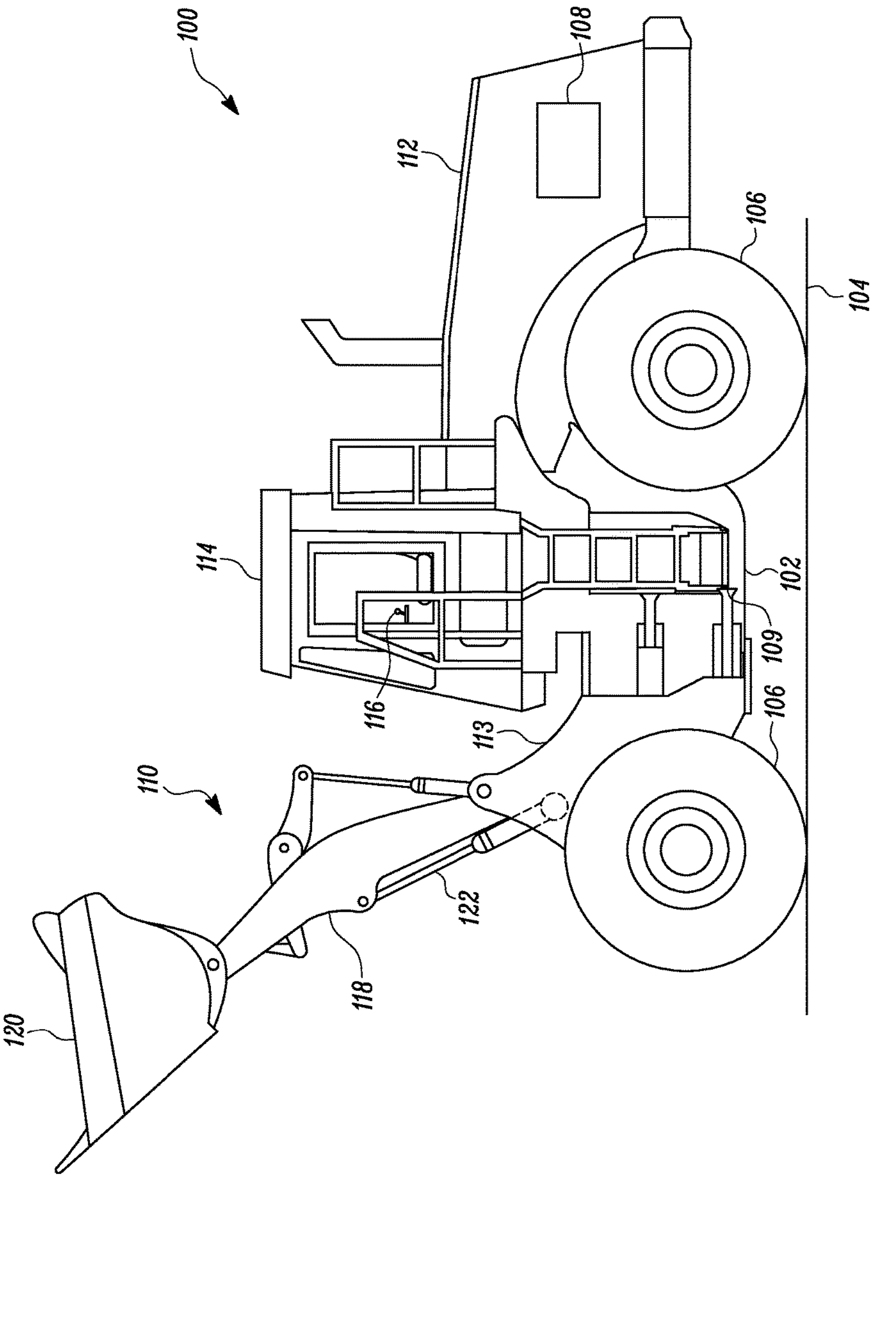
FIG. 2 is a side view of an exemplary machine of FIG. 1 in a second position.

In an embodiment, FIG. 1 and FIG. 2 illustrate side views of an exemplary machine 100 in a first position and a second position, respectively. The machine 100 has multiple systems and components that cooperate to carry out various activities, such as excavation, carrying, scooping, or otherwise moving material. In the illustrated embodiment, the machine 100 is a wheel loader. However, it may be contemplated that the machine 100 may alternatively be an excavator, a backhoe loader, a front shovel, a dragline excavator, a crane, or any another similar machine.

The machine 100 may include an undercarriage 102 for moving the machine 100 over a ground surface 104. The undercarriage 102 includes ground engaging members 106 for supporting the machine 100 and for engaging with the ground surface 104 in order to move the machine 100 along the ground surface 104. In the illustrated aspect of the present disclosure, the ground engaging members 106 are a set of wheels. However, in other aspect of the current disclosure, the ground engaging members 106 may be a pair of tracks. A power source 108 is provided for powering to the ground engaging members 106. The power source 108 may be an internal combustion engine, for example, a diesel engine, a gasoline engine, a gaseous fuel engine, or any other type of combustion engine known in the art. In alternative embodiments, for example when the machine 100 is a mining shovel, the power source 108 may be an electric motor.

The machine 100 further includes a frame 112 disposed on the undercarriage 102. The frame 112 may support various components of the machine 100 including an operator cab 114 and an implement system 110, and may include a front frame portion 113. The operator cab 114 may enclose various control members, such as one or more levers, pedals, and the like, for controlling operations of the machine 100 in response to inputs from an operator. The operator cab 114 may be provided with an operator input device 116 which is configured to receive machine operators input indicative of a desired movement of the implement system 110. The operator input device 116 may further be configured to detect the operators command to operate the power source to get power from the power source. The operator input device 116 (hereinafter referred to as "input device 116") may have proportional-type controllers configured to position and/or orient the implement system 110 by producing signals that are indicative of a desired implement system speed, movement, direction etc. In embodiment of the present disclosure the detection of operators command to get power from the power source may be obtained by detecting any of the following activity done by the operator, such as pressing of accelerator pedal, changing of gears, etc.

The implement system 110 includes a boom member 118 and an implement 120 pivotably connected to the boom member 118. The boom member 118 may be pivotally connected to the front frame member 113. The boom member 118 may be moved relative to the frame 112 and the ground surface 104 through a range motion for example between its first position (shown in FIG. 1), and its second position (shown in FIG. 2). The movement of the implement system 110 is caused by one or more hydraulic actuators 122. The one or more hydraulic actuators 122 may be connected between the front frame member 113, and the implement system 110. The input from the input device 116 may be indicative of the direction (to raise or lower) the implement system 110. Further, the input from the input device 116 may also be indicative of rate or velocity at which the implement system 110 is required to be raised or descended.

Figure 3:
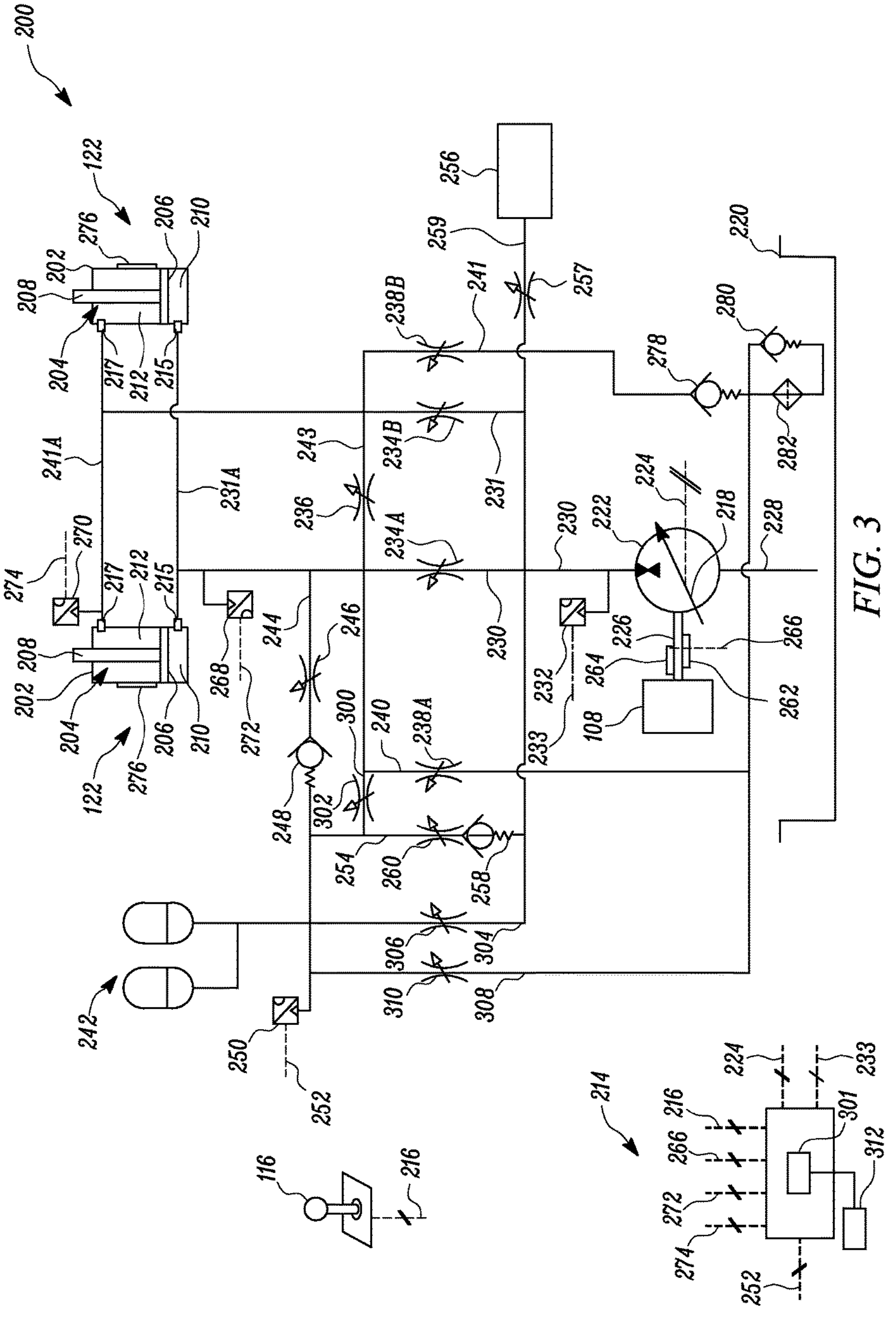
FIG. 3 is a schematic illustration of a hydraulic control system, according to an embodiment of the present disclosure.

Referring now to FIG. 3 which illustrates a hydraulic control system 200 adapted to selectively direct pressurized hydraulic fluid into and out of the hydraulic actuators 122. In an embodiment of the present disclosure, there are two hydraulic actuators 122. While the illustrated embodiment has two hydraulic actuators 122, there may be only a single hydraulic actuator or more than two hydraulic actuators. The hydraulic actuators 122 are embodied as double acting hydraulic cylinders. The hydraulic actuators 122 include a cylindrical housing 202 and a piston-rod assembly 204. The cylindrical housing 202 of the hydraulic actuator 122 has an inner surface (not numbered) defining a hollow cavity and the piston-rod assembly 204 may be adapted to slide on the inner surface within the cavity. The piston-rod assembly 204 has a piston 206 and a rod member 208. The piston 206 of the piston-rod assembly 204 is sized and shaped to fit closely against the inner surface of the cylindrical housing 202.

The piston 206 of the piston-rod assembly 204 may divide the hollow cavity within the cylindrical housing 202 into a first chamber 210 and a second chamber 212. Further, the cylindrical housing 202 may be provided with a head end port 215 associated with the first chamber 210 and a rod end port 217 associated with the second chamber 212. Pressurized hydraulic fluid may flow into and out of the first and second end chambers 210, 212, through their respective ports 215, 217 to create a pressure differential between them, and that may cause movement of the piston-rod assembly 204. One end of the rod member 208 is connected to the piston 206, and an opposite end of the rod member 208 is connected to the implement system 110 (shown in FIGS. 1 and 2). Therefore, the movement of the piston 206 may correspond to movement of the implement system 110. It may herein be noted that once the implement system 110 is raised, due to weight of the implement system 110 and weight of material carried by the implement system 110, certain amount of potential energy may be storable. Thereafter, when the implement system 110 is lowered, the piston 206 also moves pressurizing the fluid contained in the first chamber 210 in relation to the potential energy of the implement system 110.

According to an embodiment of the present disclosure, the hydraulic control system 200 further includes a controller 214 communicating with the input device 116 through a communication link 216. The hydraulic control system 200 further includes a fluid reservoir 220, and a pump motor 222 in fluid communication with the fluid reservoir 220. The fluid reservoir 220 may be adapted to store hydraulic fluid at a low pressure. Although only a single fluid reservoir 220 is shown, it is also contemplated that the hydraulic control system 200 may be in fluid communication with multiple, separate fluid reservoirs, such as the fluid reservoir 220.

The pump motor 222, such as, e.g., an over center pump, may be adapted to function both as a pump and a motor. The pump motor 222 may be in communication with the controller 214 through a communication link 224. More specifically, a swashplate 218 is movable by actuation of actuators working together to vary the displacement of the swashplate 218 to a desired angle, and control of the relative position of such actuators can be accomplished via a solenoid controlled spool valve (not shown) that is in communication with the controller 214 though communication link 224. The controller 214 may be adapted to switch the pump motor 222 between its operation as a pump and as a motor. During its operation as a pump, the pump motor 222 may act as variable positive displacement pump such that movement of the swashplate 218, which is contained within the pump, controls the output flow of the pump from a minimum to maximum. Likewise, during its operation as a motor, the pump motor 222 may have a variable displacement such that the input flow from the motor can be varied from a minimum to maximum.

The pump motor 222 may be mechanically connected to the power source 108 via a shaft 226. During operation as a motor, the pump motor 222 may provide power output (or torque assistance) to the shaft 226. The power output to the shaft 226 from the pump motor 222 may be utilized to start the power source 108. The shaft 226 may additionally be coupled to drive other auxiliary loads that may be on the machine 100.

The pump motor 222 includes a first conduit 228 and a second conduit 230 connected on opposite sides of the pump motor 222. The first conduit 228 of the pump motor 222 may be fluidly coupled to the fluid reservoir 220. During operation as a pump, the pump motor 222 may draw the hydraulic fluid from the fluid reservoir 220, through the first conduit 228, at ambient or low pressure and may pressurize the hydraulic fluid. The pressurized hydraulic fluid flow may exit through the second conduit 230 that is fluidly coupled to the pump motor 222. A pump motor pressure sensor 232 may be provided at the second conduit 230. The pump motor pressure sensor 232 may be in communication with the controller 214 through a communication link 233, to give signals indicative of pressure at the second end of the pump motor 222 or discharge side when functioning as a pump. Based on the signals given to the controller 214 through the communication link 233, the controller 214 may control the movement of the swashplate 218 to regulate the output flow from the pump. Further, when the pump motor 222 is working as a motor, the controller 214 through the communication link 233 may control the movement of the swashplate 218 to regulate the output torque at the shaft 226.

The second conduit 230, and a third conduit 231 are fluidly coupled between the pump motor 222 and the hydraulic actuators 122, and is shown to have branch portions 231A, 241A to connect to the respective chambers of the two actuators. An implement valve is included on to the second conduit 230 to regulate pressurized flow between the pump motor 222 and the hydraulic actuator 122. In an embodiment, two first valves 234A, B are provided on the second conduit 230, and the third conduit 231, as the implement valve, to either allow or to stop the flow of fluid from the pump motor 222 to the hydraulic actuators 122, although a single valve can be used instead of the two first valves 234A, B, shown in figures. Specifically, the first valves 234A, B may be fluidly coupled between the first and second chambers 210, 212 of the hydraulic actuators 122 and the pump motor 222. The first valves 234A, B can be solenoid controlled proportional valves capable of receiving communication of displacement input signal from the controller 214, and moving between an open and a closed position.

A regenerative valve 236 is fluidly coupled between the first chamber 210 of the hydraulic actuator 122 and the second chamber 212 of the hydraulic actuator 122 via a fifth conduit 243 coupled between the second conduit 230 and the third conduit 231. When the regenerative valve 236 is open, the fluid flow from one chamber, such as, e.g., the first chamber 210 of the hydraulic actuator 122 may flow to the other chamber, such as, e.g., the second chamber 212 of the hydraulic actuator 122. Similarly, fluid flow may also flow via the regenerative valve 236 from the second chamber 212 to the first chamber 210. The regenerative valve 236 can be in communication with the controller 214. The regenerative valve 236 may be a solenoid operated valve, controlled by the controller 214. The controller 214 may be adapted to move the first valve 234A and the regenerative valve 236, between their closed and an open position.

Further, two second valves 238A, B may be provided on sixth conduits 240 connecting the third conduit 231 and a fourth conduit 241 to the fluid reservoir 220. The second valves 238A, B may also be in communication with the controller 214, and the controller 214 may control the second valves 238A, B between its closed and open position. The second valves 238A, B may be a solenoid operated valves, controlled by the controller 214. In an open position, the second valves 238A, B may allow fluid from the chambers of the hydraulic actuator 122 to be drained to the fluid reservoir 220.

According to an embodiment, the pressurized fluid from the pump motor 222 may be communicated to the first chamber 210 of the hydraulic actuator 122, thereby moving the piston-rod assembly 204 to lift the implement system 110. Here, pressurized fluid is directed through the second conduit 230 and third conduit 231 by commanding the first valve 234A to move to a desired position and to the first chambers 210 via the branch portion 231A. In a different scenario, i.e. during descent of the implement system 110, the pressurized fluid from the first chamber 210 of the hydraulic actuator 122, may be communicated to the second chamber 212 of the hydraulic actuator 122, by commanding the regenerative valve 236 to an open position. Additionally, or independently, the pressurized fluid from the first chamber 210 may be communicated through the first valve 234A to drive the pump motor 222 as the motor and provide output torque at the shaft 226, thereby supplementing the power generated by the power source 108. Here, pressurized fluid from the first chambers 210 is directed through the branch portion 231A, the third conduit 231, and the second conduit 230 by commanding the first valve 234A to move to a desired position, where the fluid is eventually returned to the reservoir 220. Herein the pump motor 222 may operate as a hydraulic motor i.e. the pump motor 222 may rotate in a first rotation direction.

The hydraulic control system 200 further includes at least one fluid storage device, such as the accumulator 242. The accumulator 242 is adapted to store pressurized hydraulic fluid. The accumulator 242 is fluidly coupled to the pump motor 222 and the hydraulic actuators 122, through an accumulator conduit 244. More specifically, the accumulator conduit 244 is coupled between the second conduit 230 downstream to the first valve 234A and the accumulator 242. It may herein be noted that although figures illustrate two accumulators; there may be fewer or more number of accumulators in the hydraulic control system 200.

The accumulator conduit 244 may include an accumulator charge valve 246 to allow or restrict flow of fluid to the accumulator 242 from the second conduit 230. The accumulator charge valve 246 may be in communication with the controller 214. The controller 214 may be adapted to move the accumulator charge valve 246 between a closed and open position. Further, the accumulator conduit 244 may include a one-way check valve 248 between the third conduit 231 and the accumulator 242. The one-way check valve 248 may be configured to provide one-way flow direction when opened based upon a predetermined pressure as provided with the force setting of its spring.

An accumulator pressure sensor 250 can be provided to indicate and determine the pressure at the accumulator 242. The accumulator pressure sensor 250 may be in communication with the controller 214 through a communication link 252, and may provide accumulator pressure inputs to the controller 214.

In one embodiment, the machine 100 may be provided with a ride control arrangement 301. For example an electronic control arrangement and system to implement a ride control strategy, for controlling one or more functions of the machine 100. In an embodiment the controller 214 may be one or more electronic control units and/or one or more relay based system. It may for example be configured to receive and process signals and/or instructions from an input means e.g., the operator input device 116, through the communication link 216. In an embodiment, the operator input device 116 may include multiple operator controls such as a joystick or switch arrangements. In an embodiment the operator input device 116 may be used to select one or more settings associated with at least one ride control setting. In an embodiment the control arrangement may be configured to receive and process a signal from a first sensing arrangement 312. The first sensing arrangement sensor 312 may be any type of equipment capable of providing an indication of a speed of the machine 100, through communication link 266 from the shaft speed sensor 262 and a shaft torque sensor 264. In an embodiment the first sensing arrangement 312 may also include a radar arrangement for detecting ground speed. In another embodiment the first sensing arrangement 312 may include sensor for measuring a velocity parameter of the machine itself, such as, for example, an angular speed of a rotating component such as a transmission shaft 226.

In an embodiment the machine 100 may further be provided with a second sensing arrangement (not shown) for providing data regarding the loading of either or both of the first and second actuators 122. The second sensing arrangement may, for example, include one or more pressure sensors 270 and 272 configured to measure fluid pressures associated with any of the first and second actuators 122. In an embodiment, the second sensing arrangement may include sensors capable of measuring deflection of components such as the boom member 118 of the machine 100. For example strain gauges (not shown) may provide an indication about the deflection of, for example, a portion of a first connection 109 (shown in FIGS. 1 and 2) and/or the second connection.

A ride control conduit 300 can be provided to connect the accumulator 242 with the hydraulic actuator 122, and in particular the first chamber 210 of the hydraulic actuator 122. The ride control conduit 300 can include a ride control valve 302, such that the ride control valve 302 is fluidly coupled between the accumulator 242 and the actuator. The ride control valve 302 is a solenoid valve is movable between open and closed positions. The solenoid is capable of receiving input signal commands from the controller 214.

For example the controller 214 may receive signals from input means such as the operator input device 116, the first sensing arrangement 312, or otherwise and accordingly determine that machine 100 is in riding mode. Further the controller 214 may receive signals that the bucket or actuators are otherwise in a loading condition. Based on this information, the controller 214 may determine to implement a ride control strategy by providing an output a signal to open the ride control valve 302. Simultaneously, the controller 214 may move each of the accumulator valve 306 and the accumulator charge valve 246 to the closed position thereof. In the open position (illustrated in FIG. 4), the ride control valve 302 allows fluid communication between the accumulator 242 with the hydraulic actuator 122. The ride control valve 302 is in parallel arrangement with the accumulator charge valve 246.

An accumulator discharge conduit 254 is fluidly coupled to the accumulator 242. The accumulator discharge conduit 254 may be connected to the second conduit 230, and may be extended to an auxiliary circuit 256, such as e.g. a second hydraulic circuit, such as e.g., for tilt actuators (not shown). The accumulator discharge conduit 254 may include at least one of the one-way check valve 258 and an accumulator discharge valve 260. The accumulator discharge valve 260 is a solenoid valve is movable between open and closed positions. The solenoid is capable of receiving input signal commands from the controller 214. The accumulator discharge conduit 254 may include an auxiliary valve 257 upstream of the auxiliary circuit 256. The auxiliary valve 257 is a solenoid valve is movable between open and closed positions. The solenoid is capable of receiving input signal commands from the controller 214. In an open position, the accumulator discharge valve 260 may allow fluid from the accumulator discharge conduit 254 to the auxiliary circuit 256, via the conduit 259.

A second accumulator charge and discharge conduit 304 can also be fluidly coupled to the accumulator 244. The second accumulator charge and discharge conduit 304 may be connected to the second conduit 230 and the pump motor 222, such as, e.g., in parallel with the accumulator discharge conduit 254. For instance, the second accumulator charge and discharge conduit 304 may be connected to the second conduit 230 extending from the pump motor 222, shown in FIG. 5.

The second accumulator charge and discharge conduit 304 can include an accumulator valve 306. The accumulator valve 306 is a solenoid valve is movable between open and closed positions. The solenoid is capable of receiving input signal commands from the controller 214.

An accumulator drain conduit 308 may also be connected between the accumulator 242 and the fluid reservoir 220, such as, e.g., in parallel with the second accumulator charge and discharge conduit 304. The accumulator drain conduit 308 may also contain an accumulator drain valve 310. The accumulator drain valve 310 may be in parallel arrangement with the accumulator valve 306. The accumulator drain valve 310 is a solenoid valve is movable between open and closed positions. The solenoid is capable of receiving input signal commands from the controller 214. In an open position, the accumulator drain valve 310 may allow fluid from the accumulator 242 to be directed to the fluid reservoir 220.

The hydraulic control system 200 may further include at least one of a shaft speed sensor 262 and the shaft torque sensor 264 (both shown) coupled to the shaft 226 of the power source 108. The shaft speed sensor 262 and the shaft torque sensor 264 may be adapted to determine values indicative of the shaft speed and the shaft torque, respectively. The shaft speed sensor 262 and the shaft torque sensor 264 are each in communication with the controller 214 through a communication link 266.

In an embodiment of the present disclosure, pressure sensors 268 and 270 may also be provided to determine the pressure in the first chamber 210 of the hydraulic actuator 122 and the second chamber 212 of the hydraulic actuator 122, respectively. Pressure value information pertaining to the first chamber 210 and the second chamber 212 can be provided to the controller 214 via the communication links 272 and 274, respectively. A position sensor 276 may be provided on one or each of the hydraulic actuators 122. The position sensor 276 may be adapted to relative position, of the piston-rod assembly 204 of the hydraulic actuator 122. The position sensor 276 may also be in communication with the controller 214 that can calculate via the algorithms other cylinder information such as, e.g., the speed and direction of movement of the piston-rod assembly 204 of the hydraulic actuator 122.

Figure 4:
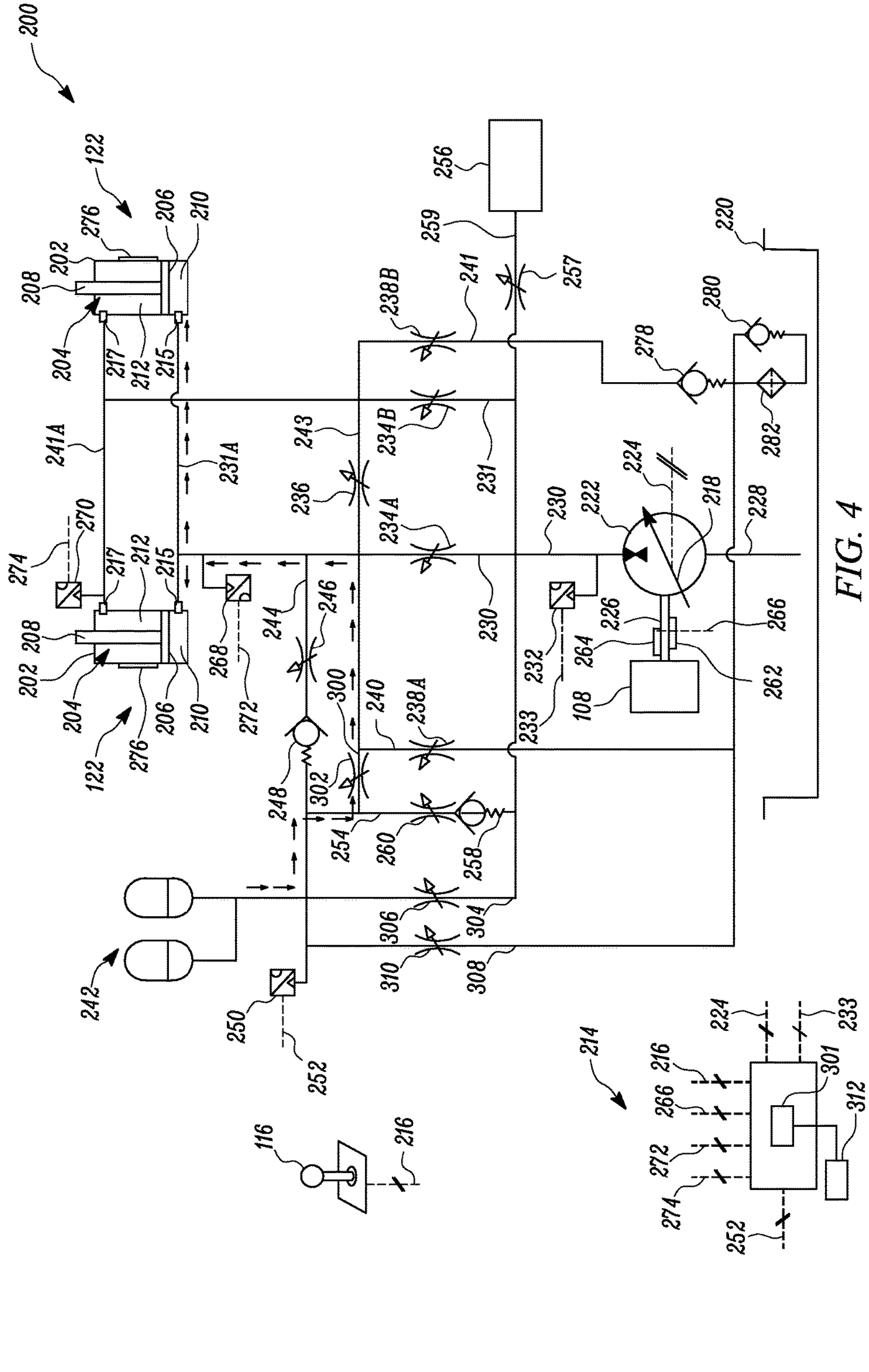
FIG. 4 is another schematic illustration of the hydraulic control system, according to an embodiment of the present disclosure.

In an embodiment of the present disclosure, the controller 214 may be configured to implement a ride control dampening the controller 214 may compare the pressure values communicated from the pressure sensors 268 and 270 and the pressure values from the accumulator pressure sensor 250 to the controller 214. When pressure differential between the pressure at the accumulator 242 and the pressure at the hydraulic actuator 122 is at a predetermined threshold, the controller 214 may move the ride control valve 302 to the open position to fluidly connect the accumulator 242 with the hydraulic actuator 122, such as shown in FIG. 4. The valve 302 opening may be adjusted to change ride control damping.

The controller 214 may track the operating status of the power source 108. The power source 108 activity may be determined based on the power derived from the power source 108. This input may be supplied to the controller 214 by the shaft speed sensor 262 and the shaft torque sensor 264 through the communication link 266. Based on the power source 108 activity during a predetermined duration of time, the controller 214 may determine a start stop of the engine between its idle cycle and an active cycle.

The controller 214 may also determine if the pressure at the accumulator 242 is below the threshold pressure. In one embodiment, the threshold pressure in the accumulator 242 may be equivalent to a minimum pressure required by the accumulator 242 to start the power source 108 at least once. The controller 214 may, upon determining the operating status of the power source 108 to be active, and the pressure within the accumulator 242 to be below the pressure threshold, move the first valve 306 to an open position. Therefore the accumulator 242 may receive pressurized fluid from the pump motor 222. The controller 214 may subsequently close the valve 306, once the operating status of the power source 108 is determined to be idle or turned off, or the pressure at the accumulator 242 to be above the threshold pressure in the accumulator 242. In case, the controller 214 may determine a particular cycle as idle cycle and if the pressure in the accumulator 242 is determined to be above the pressure threshold, the controller 214 may stop the power source 108.

Figure 5:
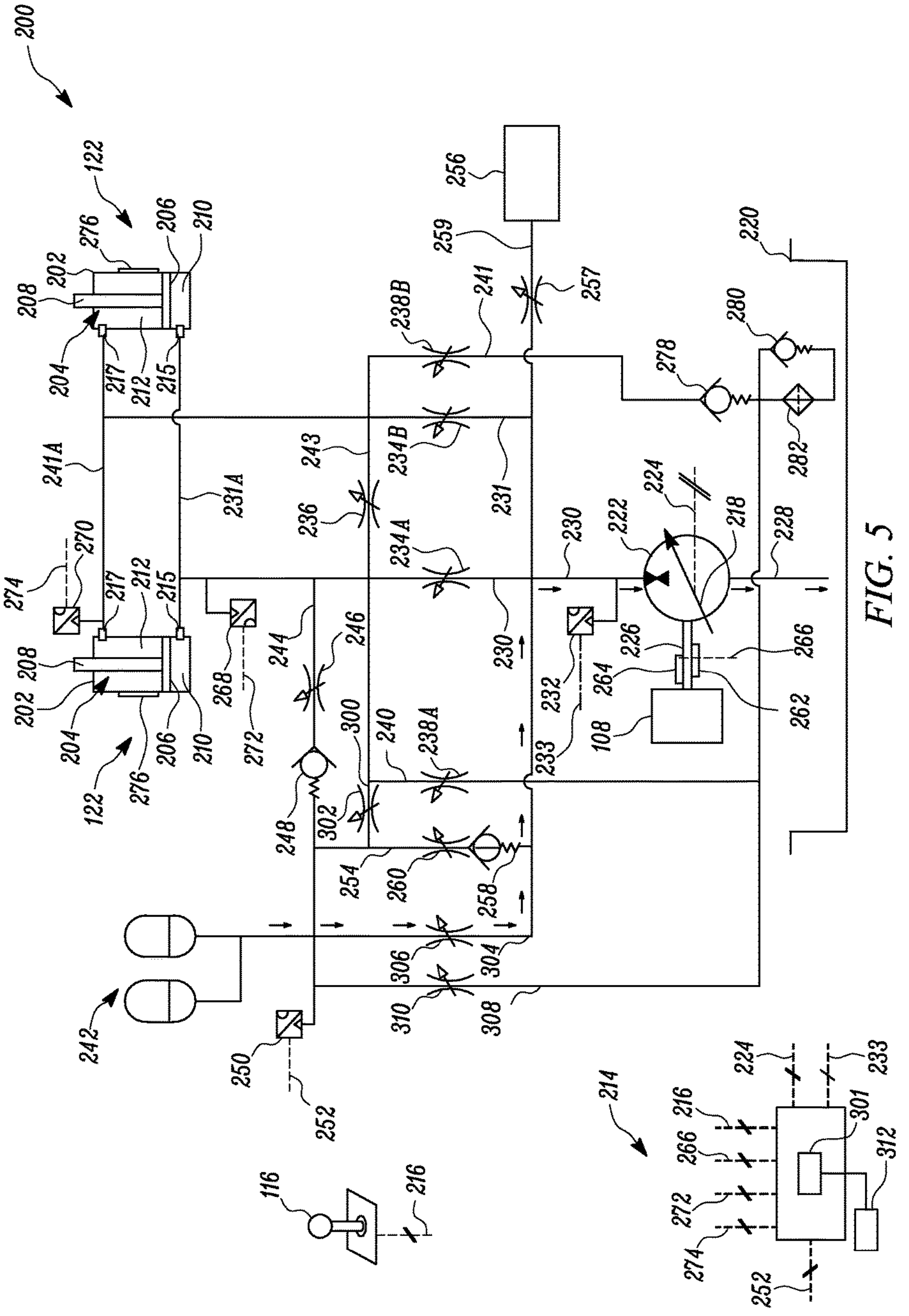
FIG. 5 is another schematic illustration of the hydraulic control system, according to an embodiment of the present disclosure.

Referring now to FIG. 5, when the operating status of the power source 108 to determine to be idle and the controller 214 detects the operators command to get power from the power source 108, the controller 214 may selectively move the accumulator valve 306 to the open position. In the open position, the accumulator valve 306 to fluidly connect the accumulator 242 with the pump motor 222. Therefore in the open position of the accumulator valve 306, the fluid form the accumulator 242 may drive the pump motor 222, operating as a motor, to drive the shaft 226 thereby assisting in starting the power source.

More specifically, the controller 214 is adapted to continuously monitor the operation status of the power source 108 to selectively stop and restart the power source 108, to improve the efficiencies of the machine 100 during idle periods of time. After the start of the power source 108, the controller 214 may continuously check if the operator is inside the machine 100 and actively operating the machine 100. The controller 214 may determine that the operator is inside machine 100 and actively operating the machine 100 based on any number of parameters known in the art. For example, the operator may be determined to be inside the operators cab 114 based on activation of a seatbelt sensor, a door sensor, or another similar sensor, and actively operating the machine 100 based on detected movement of input device 116. When the controller 214 determines that the operator is not inside the machine 100 or inside but not actively operating the machine 100 (e.g., for at least a predetermined minimum threshold period of time), it may mean that the power source 18 is in an off condition, the controller 214 may thereafter check to see if it is ok to stop down the power source 108.

In some situations, shutting down the power source 108 could cause damage to the power source 108 and/or other machine components, or present undesired situations. These situations may occur when the power source 108 is operating at a speed above or below a desired range, when an exhaust treatment device of the power source 108 is undergoing a regeneration event, when a temperature of the power source 108 falls outside of a desired range, when a battery level is too low to restart the power source 108, etc. The controller 214 may determine if it is ok to shut down the power source 108 by checking the status of these conditions. Following these checks, the controller 214 may again check to see if the operator has become active during completion of checks. When the controller 214 determines that the operator has remained inactive, the controller 214 may check to see if the accumulator 242 has a pressure above a predetermined pressure threshold i.e. the accumulator 242 has accumulated sufficient fluid volume with energy to hydraulically restart the power source 108, such as, for example, via signals from communication link 252 and/or state of sensor 250. Based on the accumulator pressure values, the controller 214 may be able to determine (e.g., based on a map stored in a memory of the controller 214) if a sufficient fluid energy is there to restart the power source 108.

If the controller 214 determines that the accumulator 242 does not have enough fluid energy i.e. the pressure at the accumulator 242 is below a pressure threshold, and/or state of charge at the right pressure, temperature, volume, energy capacity, etc. to restart the power source 108, the controller 214 may, prior to commanding the power source 108 to a stopped condition, cause the accumulator 242 to be charged. In order to charge the accumulator 242, the controller 214 may direct pressurized fluid from pump motor 222 into the accumulator 242, consistent with any of the embodiments as disclosed herein, such as, in one example, by generating and electronically transmitting a signal to move the valve 306 to its open position to allow fluid from pump motor 222 to enter the accumulator 242, via the accumulator conduit 304.

The controller 214 may continue to check on the charge of the accumulator 242, and then proceed to command the power source 108 to a stopped condition (shut down condition) when sufficient charge has been detected. In one example, the controller 214 can be electronically and controllably connected to effectuate the power source 108 shutdown by cutting off, disconnecting, or otherwise preventing a flow of fuel to the power source 108 or otherwise disengaging fuel combustion of the power source 108, which can be by generating and electronically transmitting an engine shutdown command to the power source 108 and/or the fuel supply system thereof, such as, for example, to fuel injectors or fuel pumps (not shown) associated with the power source 108, and in one embodiment, one or more electric drivers and/or controllers associated therewith.

When the power source 108 is stopped, the controller 214 may continuously monitor at least three different things. For example, controller 214 may monitor the operator to determine if the operator has become active (i.e. if there is an operator command to power from the power source 108), monitor machine parameters to see if they have deviated from desired levels, and check to see if the operator has left the operators cab 114, or if machine 100 is experiencing unexpected problems. The power source 108 may remain off, as long as the operator remains inactive inside the operator's cab 114, the machine parameters are within threshold limits, and no problems with machine 100 have been detected.

However, if the controller 214 determines that the operator has become active, the controller 214 may cause the power source 108 to restart. In one example, the controller 214 can be electronically and controllably connected to effectuate the power source 108 ignition or re-start, in part, by generating and electronically transmitting an engine start command to the power source 108 and/or the fuel supply (or combustion) system thereof, to resume the flow of fuel to the power source 108, as well as the moving the accumulator valve 306 to the open position to fluidly connect the accumulator 242 with the pump motor 222. Therefore in the open position of the accumulator valve 306, the fluid form the accumulator 242 may drive the pump motor 222, operating as a motor, to drive the shaft 226 thereby assisting in starting the power source 108, as shown in FIG. 5.

When the power source 108 has been successfully restarted, the controller 214 may again check to see if the operator is active and if the machine parameters are within the desired range. As long as the operator remains inactive and the machine parameters are outside the desired range, the controller 214 may keep the power source 108 running without the pump motor power. When the controller 214 determines that the operator has become active, i.e. the operator has commanded power from the power source 108, the machine starts its regular operation.

It should be noted that although any one or more of accumulators could be utilized in various embodiments, for the purposes of illustration, an embodiment utilizing a single accumulator 242 is discussed. In particular, a restart command may be generated and electronically transmitted to controller 214, in one example, in response to an operator initiating or requesting the power source 108 restart by actuating an input device 116 (such as any one or more of a joystick, pedal, ignition switch, start button, or the like) (or alternatively, generated via the controller 214 in response to machine 100 conditions consistent with any one or more of the embodiments disclosed herein). In response to the restart command, the controller 214 may obtain, receive, and/or monitor and process signals generated by state of sensors (such as one or more of signals indicative of pressure, volume, temperature signals, etc. as discussed above, and in one embodiment, may additionally receive and process signals from sensor) to determine a state of charge of the accumulator 242, which can, as discussed above, be defined as and indicative of the dynamic, pressurized, thermal, and/or volumetric fluid charge energy of and available within the accumulator 242. The controller 214 may then determine an available output torque value based upon the state of charge of the accumulator 242. The available output torque value may be determined or calculated by the controller 214 as the amount of torque which may be generated or output by directing the fluid within the accumulator 242 to the pump motor 222 based upon the state of charge, or charge energy of and available within the accumulator 242. In particular, a determined state of charge value, and/or the readings or values of one or more of the pressure, volume, temperature signals, etc. as discussed above indicative of the state of charge may be referenced with a lookup table or map, or input into a program by the controller 214 (and stored within the memory thereof) to determine or calculate the available output torque value based upon the available energy output capacity, or state of charge, of the accumulator 242 and the fluid therein.

The controller 214 may then compare the determined or calculated available output torque value with reference torque values (which may be set or input and stored within the memory of the controller 214) to determine whether to generate and transmit the appropriate commands to execute a hydraulic start, an electric start, or a combined or "blended" hydraulic and electric start or ignition of the power source 108. In particular, the controller 214 may then compare the determined or calculated available output torque value in relation to a maximum threshold starting torque value and a minimum threshold starting torque value. The maximum threshold starting torque value may be a value which is established, based on the specific parameters of the system, as corresponding to a threshold torque which may produce a power source speed or rpm sufficient to generate or achieve power source ignition. The minimum threshold starting torque value may be a value which is established, based on the specific parameters of the system, as corresponding to a threshold torque which may be sufficient to assist in generating or achieving power source ignition.

If, based on the comparison, which may be executed by the controller 214 utilizing a lookup map or table or program, the determined or calculated available output torque value is equivalent to or greater than the reference maximum threshold starting torque value, the controller 214 may cause the pump motor 222 to hydraulically restart power source 108 alone, such as, in one example, by generating and electronically transmitting an engine start command to the accumulator valve 306 to direct and control the release of pressurized hydraulic fluid from the accumulator 242 to operatively engage and actuate the power source 108 to execute a hydraulic start or ignition.

The controller 214 is also adapted to determine when the power source 108 is completely turned off and the power source has stopped. For example when the operator moves an ignition key to an off position, or when an engine turn off button is operated, the controller 214 may to determine that the power source 108 is completely turned off. Once the controller 214 determines that the power source 108 is completely turned off, the controller 214 may move the accumulator drain valve 310 to the open position. In the open position, the accumulator drain valve 310 may allow fluid from the accumulator 242 to go to the fluid reservoir 220. However, once the controller 214 determines the power source 108 has been turned on. For example, when the operator moves an ignition key to an on position, or when an engine turn on button is operated, the controller 214 may to determine that the power source 108 is actuated to an operating condition, the controller 214 may move the valve 306 to an open position to allow the pump motor 222 to charge the accumulator 242, while moving the accumulator drain valve 310 to the closed position.

The hydraulic control system 200 further includes a set of check valves 278, 280, and a filter element 282. The set of check valves 278, 280, and the filter element 282 are provided on the drain conduit 240. In an embodiment of the present disclosure, the set of check valves 278, 280 are one directional spring loaded check valves, which allow flow from only one direction.

The controller 214 may include a processor (not shown) and a memory component (not shown). The processor may include microprocessors or other processors as known in the art. In some embodiments the processor may include multiple processors. The processor may execute instructions to close or open various valves such as the first valve 234A, the regenerative valve 236, the accumulator charge valve 246, the accumulator discharge valve 260, the ride control valve 302, the accumulator valve 306, and the accumulator discharge valve 260 based on the inputs from the sensors 250, 262, 264, 268 etc.

INDUSTRIAL APPLICABILITY

The hydraulic control system 200 can be used in various machines; the machine may be associated with certain operations for industries, such as mining, construction, agriculture, and transportation. The disclosed hydraulic control system 200 may help to reuse energy stored, that may otherwise get wasted in the form of heat in the fluid reservoir 220. The hydraulic control system 200 uses the energy in starting the power source from an idle condition thereof.

Further, by selectively coupling the accumulator 242 with the hydraulic actuator 122, the hydraulic control system 200 utilizes the stored energy in balancing pressure in the actuators thus providing better ride control. In particular, when a machine, such as, e.g., a wheel loader, is being driven for a distance with a loaded bucket there is always the possibility that the machine will be subjected to shocks due to the weight of the loaded bucket reacting to the machine encountering bumps or other obstacles in its pathway. To help reduce or eliminate shocks, the accumulator can be selectively connected to the actuators. The accumulator when connected to the loaded end of the actuators, such as the first chamber, can be configured to absorb the pressure fluctuations in the actuators thus offsetting the changing forces that produce shocks that would otherwise be acting on the various components of the machine. In order to maintain a pre-charge in the accumulator substantially equal to the pressure in the loaded end of the actuators, the accumulator, during normal use, are fluidly coupled to the first chamber ("loaded end") of the actuator. When the ride control system is active, the valve 302 is moved at least partially open such that the first chamber of the actuator is restrictively in communication with the accumulator in order to absorb the changing forces.

Figure 6:
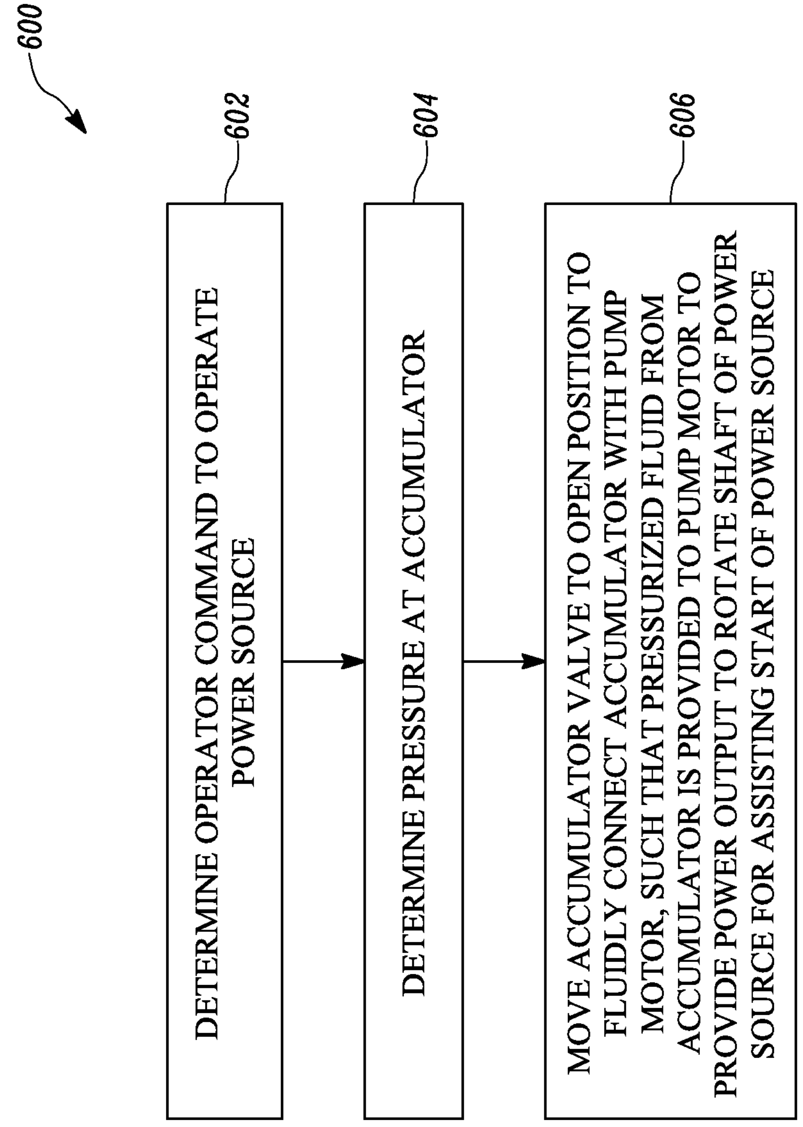
FIG. 6 is a flowchart of a method of operating the hydraulic control system, according to an embodiment of the present disclosure.

FIG. 6 illustrates an exemplary flowchart 600 disclosing operation of the hydraulic control system 200 for a machine 100 having a power source, such as the power source 108. At step 602, the method includes determining an operator command to operate the power source 108. Such a detection of the operator command to get power from the power source 108 may be obtained in many ways such as acceleration of the machine 100 by the operator. At step 604, the method includes determining a pressure at the accumulator 242. The accumulator pressure sensor 250, through the communication link 252, may provide the pressure information to the controller 214. At this step, the controller may set the pump motor 222 to operate as a motor. As discussed the pump motor 222 is adapted to operate both as a pump and as a motor. The controller 214 through the communication link 224 may set the pump motor 222 to operate as a motor. At step 606, the method includes moving an accumulator valve 306 to the open position, to fluidly connect the accumulator 242 with the pump motor 222, such that pressurized fluid from the accumulator 242 is provided to the pump motor 222 to provide power output to rotate a shaft 226 of power source 108 for assisting start of the power source 108. Therefore, the fluid energy stored in the accumulator 242 may be utilized in starting in the powers source 108 from an idle condition thereof.

According to an embodiment of the present disclosure the controller 214 may selectively move the accumulator charge valve 246 to the open position to fluidly connect the accumulator 242 with the actuator 202 when a pressure differential between the pressure at the accumulator 242 and the pressure at the actuator 202 is at a predetermined threshold range.

Further, the controller 214 may move the accumulator valve 306 to an open position for supplying pressurized fluid from the pump motor 222 to the accumulator 242. This may be done, in response to determining an operating status of the power source 108 as active, and the pressure at the accumulator 242 is below a pressure threshold.

According to an embodiment of the present disclosure the controller 214 may monitor the power source 108 to determine a condition of the power source 108. Further detect the pressure at the accumulator 242 to be above or below a predetermined pressure threshold. Once the controller 214 determines the power source 108 to be idle, and the pressure at the accumulator 242 to be above the pressure threshold, the controller 214 may stop the power source 108. The controller 214 may further open the accumulator drain valve 310 to fluidly connect the accumulator 242 with the fluid reservoir 20, in response to determining that the power source 108 to be completely turned off.

When a machine wheel loader, is being driven for a distance with a loaded bucket there is always the possibility that the machine will be subjected to shocks due to the weight of the loaded bucket reacting to the machine encountering bumps or other obstacles in its pathway. In order to help reduce or eliminate shocks, it is known to use accumulators that are selectively connected to the lift cylinder actuator. These accumulators, when connected to the loaded end of the actuators, serve to absorb the pressure fluctuations in the actuators thus offsetting the changing forces that would otherwise be acting on the various components of the machine. It is these changing forces acting on the machine that produces the shocks. In order to maintain a pre-charge in the accumulator equal to the pressure in the loaded end of the actuators, it is known to connect the accumulator, during normal use, to the loaded end of the lift cylinder actuator. This is normally accomplished by connecting a conduit therebetween. The conduit normally has an orifice therein that is selectively disposed in the conduit when the machine is not operating in the ride control mode. When the ride control system is active, the load supporting end of the cylinder is restrictively in communication with the accumulator in order to reduce the changing forces. It has been found in at least some situations that the degree of damping during ride control should be varied based on the magnitude of the shock to the machine.

Further, the controller 214 may detect that the power source 108 is turned on and thereafter, open the accumulator charge valve 306 to an open position to allow the pump motor 222 to charge the accumulator 242. The controller 214 may move the ride control valve 302 to an open position thereof to allow fluid communication between the accumulator 242 and the hydraulic actuator 122 to keep pressure at the accumulator 242 and the hydraulic actuator 122 substantially equal.

With the present disclosure, the system 200 and the method 600 enable better utilization of the energy stored in the fluid contained in the actuators 122. Specifically, by selectively supplying the pressurized fluid contained in the accumulator 242 to the pump motor 222, the system 200 enables utilization of the stored energy in starting the power source 108 from an idling condition thereof. Further, the disclosed system 200 and the method 600 allow ride control of the machine 100 by selectively collecting the accumulator 242 with the hydraulic actuator 122. Furthermore, the disclosed system 200 and the method 600 allow for energy recirculation using a single pump motor 222. Therefore a need of having a separate motor and pump is also eliminated.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic control system for a machine having a power source, the hydraulic control system comprising:
- a fluid reservoir;
- a pump motor coupled to a power source via a shaft, the pump motor fluidly coupled to the fluid reservoir, the pump motor configured to provide pressurized fluid and to receive fluid to provide a power output to the shaft;
- an actuator having a first chamber and a second chamber, each of the chambers being fluidly coupled to the pump motor;
- an accumulator fluidly coupled to the pump motor and the actuator;
- an accumulator valve being movable between a closed and an open position, the accumulator valve fluidly coupled between the accumulator and the pump motor, and
- a controller in communication with the pump motor and the accumulator valve, wherein the controller is configured to:
  - detect an operator command to operate the power source;
  - determine a pressure of the accumulator; and
  - move the accumulator valve to the open position to fluidly connect the accumulator with the pump motor to provide power output to rotate the shaft to assist in starting the power source and
- an accumulator charge valve movable between a closed and an open position, the accumulator charge valve adapted to selectively fluidly connect the accumulator with the actuator,
  - wherein the controller is configured to move the accumulator valve to the closed position and move the accumulator charge valve to the open position to fluidly connect the accumulator with the actuator when pressure differential between a pressure of the accumulator and a pressure of the actuator is at a predetermined threshold range;
- a first valve movable between a closed and an open position, the first valve disposed between the pump motor and the actuator and between the pump motor and the accumulator, the first valve in communication with the controller and adapted to selectively fluidly connect the accumulator and the actuator with the pump motor, wherein the controller is configured to:
  - move the accumulator valve to the closed position;
  - move the accumulator charge valve to the open position; and
  - move the first valve to the open position to allow the supply of the pressurized fluid from the pump motor to the accumulator in response to when an operating status of the power source is determined to be placed in an operating condition and the pressure at the accumulator is determined to be below a pressure threshold.

2. The hydraulic system of claim 1 wherein the controller is configured to:
- monitor the operation status of the power source to determine a stopped condition of the power source;
- command the power source to the stopped condition when a pressure of the accumulator is determined to be above the pressure threshold.

3. The hydraulic system of claim 2 comprising an accumulator drain valve movable between a closed and an open position, the accumulator drain valve in parallel arrangement with the accumulator valve, the accumulator drain valve in communication with the controller and adapted to selectively fluidly connect the accumulator with the fluid reservoir in response to when the power source is determined to be in the stopped condition.

4. The hydraulic system of claim 3 wherein the controller is configured to:
- determine when the power source is actuated to an operating condition;
- move each of the accumulator valve and the accumulator drain valve to the closed position;
- and move each of the accumulator charge valve and the first valve to the open position to allow the pump motor to charge the accumulator.

5. The hydraulic control system of claim 1 comprising:
- a ride control valve movable between a closed position and an open position, the ride control valve is fluidly coupled between the accumulator and the actuator, and in communication with the controller, wherein the ride control valve and the accumulator charge valve is in parallel arrangement;
- wherein the controller is configured to:
  - move each of the accumulator valve and the accumulator charge valve to the closed position; and
  - move the ride control valve to the open position to allow fluid communication between the accumulator and the actuator.

6. A method of operating a hydraulic control system having a power source, the method comprising:
- determining an operator command to operate the power source;
- determining a pressure at an accumulator;

moving an accumulator valve to an open position to fluidly connect the accumulator with a pump motor, such that pressurized fluid from the accumulator is provided to the pump motor to provide power output to rotate a shaft of power source for assisting start of the power source;

moving the accumulator valve to a closed position;

selectively moving a first valve to an open position for supplying pressurized fluid from the pump motor to the accumulator in response to determining an operating status of the power source, and a pressure of the accumulator is below a pressure threshold; and selectively moving an accumulator charge valve to an open position to fluidly connect the accumulator with an actuator when a pressure differential between a pressure of the accumulator and a pressure of the actuator is at a predetermined threshold range.

7. The method of claim 6 further comprising:

monitoring the operating status of the power source to determine a condition for stopping the power source; and command the power source to a stopped condition and the pressure at the accumulator is detected to be above the pressure threshold.

8. The method of claim 7 further comprising:

determining the operating status of the power source is in an off condition, based on an operator command; and prior to commanding the power source to a stopped condition, moving the accumulator charge valve to an open position to allow the pump motor to charge the accumulator, and move a first valve to the open position.

9. The method of claim 6 further comprising:

moving the accumulator valve to a closed position; and moving a ride control valve to an open position to allow fluid communication between the accumulator and the actuator.

10. A machine having a work tool movable through a range of motion, the work machine comprising:

a power source;

a fluid reservoir;

a pump motor coupled to a power source via a shaft, the pump motor fluidly coupled to the fluid reservoir, the pump motor configured to provide pressurized fluid and to receive fluid to provide a power output to the shaft;

an actuator having a first chamber and a second chamber, each of the chambers being fluidly coupled to the pump motor;

an accumulator fluidly coupled to the pump motor and the actuator;

an accumulator valve being movable between a closed and an open position, the accumulator valve fluidly coupled between the accumulator and the pump motor, and a controller in communication with the pump motor and the accumulator valve, wherein the controller is configured to:

detect an operator command to operate the power source;

determine a pressure of the accumulator; and move the accumulator valve to the open position to fluidly connect the accumulator with the pump motor to provide power output to rotate the shaft for assisting in starting the power source; and an accumulator charge valve movable between a closed and an open position, the accumulator charge valve adapted to selectively fluidly connect the accumulator with the actuator, wherein the controller is configured to move the accumulator charge valve to the closed position and move the accumulator charge valve to the open position to fluidly connect the accumulator with the actuator when pressure differential between a pressure of the accumulator and a pressure of the actuator is at a predetermined threshold range; and a first valve movable between a closed and an open position, the first valve disposed between the pump motor and the actuator and between the pump motor and the accumulator, the first valve in communication with the controller and adapted to selectively fluidly connect the accumulator and the actuator with the pump motor, wherein the controller is configured to:

move the accumulator valve to the closed position;

move the accumulator charge valve to the open position; and move the first valve to the open position to allow the supply of the pressurized fluid from the pump motor to the accumulator, in response to when an operating status of the power source is determined to be places in an operating condition, and the pressure at the accumulator is determined to be below a pressure threshold.

11. The work machine of claim 10 wherein the controller is configured to:

monitor the operating status of the power source to determine a stopped condition of the power source; and command the power source to the stopped condition when a pressure of the accumulator is determined to be above the pressure threshold.

12. The work machine of claim 11 comprising an accumulator drain valve movable between a closed and an open position, the accumulator drain valve in parallel arrangement with the accumulator valve, the accumulator drain valve in communication with the controller and adapted to selectively fluidly connect the accumulator with the fluid reservoir in response to when the power source is determined to be in the stopped condition.

13. The work machine of claim 10, comprising:

a ride control valve movable between a closed position and an open position, the ride control valve is fluidly coupled between the accumulator and the actuator, and in communication with the controller, wherein the ride control valve and the accumulator charge valve is in parallel arrangement; and wherein the controller is configured to:

move each of the accumulator valve and the accumulator charge valve to the closed position; and move the ride control valve to the open position to allow fluid communication between the accumulator and the actuator.

* * * * *